June 2, 1970  C. J. GIACOBBE  3,515,436

VEHICLE TIRE MOUNT

Filed March 27, 1968  2 Sheets-Sheet 1

Inventor:
Charles J. Giacobbe
by Harold E. Cole
Attorney

June 2, 1970     C. J. GIACOBBE     3,515,436

VEHICLE TIRE MOUNT

Filed March 27, 1968     2 Sheets-Sheet

Inventor:
Charles J. Giacobbe
by Harold E. Cole
Attorney

United States Patent Office 3,515,436
Patented June 2, 1970

3,515,436
VEHICLE TIRE MOUNT
Charles J. Giacobbe, 414 Ashmont St., Dorchester, Boston, Mass. 02124
Filed Mar. 27, 1968, Ser. No. 716,518
Int. Cl. B60b 3/08
U.S. Cl. 301—38                    1 Claim

ABSTRACT OF THE DISCLOSURE

A tire mount for a vehicle wheel has inner and outer wheel discs telescopically assembled each having an emergency wheel rim normally circumferentially inward of an inflated tire mounted thereon; but which serve as traction wheel rims when the tire shrinks upon deflation and is peripherally inward of said rims.

---

One object of my invention is to provide members on said inner and outer wheel discs that help retain a tire in proper position when inflated; but permit the beads of a deflated tire to move inwardly towards each other to an emergency tire receiver flange when the tire is deflated.

Another object is to provide intermediate means between said tire receiver members which provide slanting surfaces over which a deflated tire will slide from the normal position to said emergency flange.

The foregoing and other objects, which will appear as the nature of the invention is better understood, may be accomplished by a construction, combination and arrangement of parts such as is disclosed by the drawings. The nature of the invention is such as to render it susceptible to various changes and modifications, and, therefore, I am not to be limited to the construction disclosed by the drawings nor to the particular parts described in the specification; but am entitled to all such changes therefrom as fall within the scope of my claims.

Figure 1:
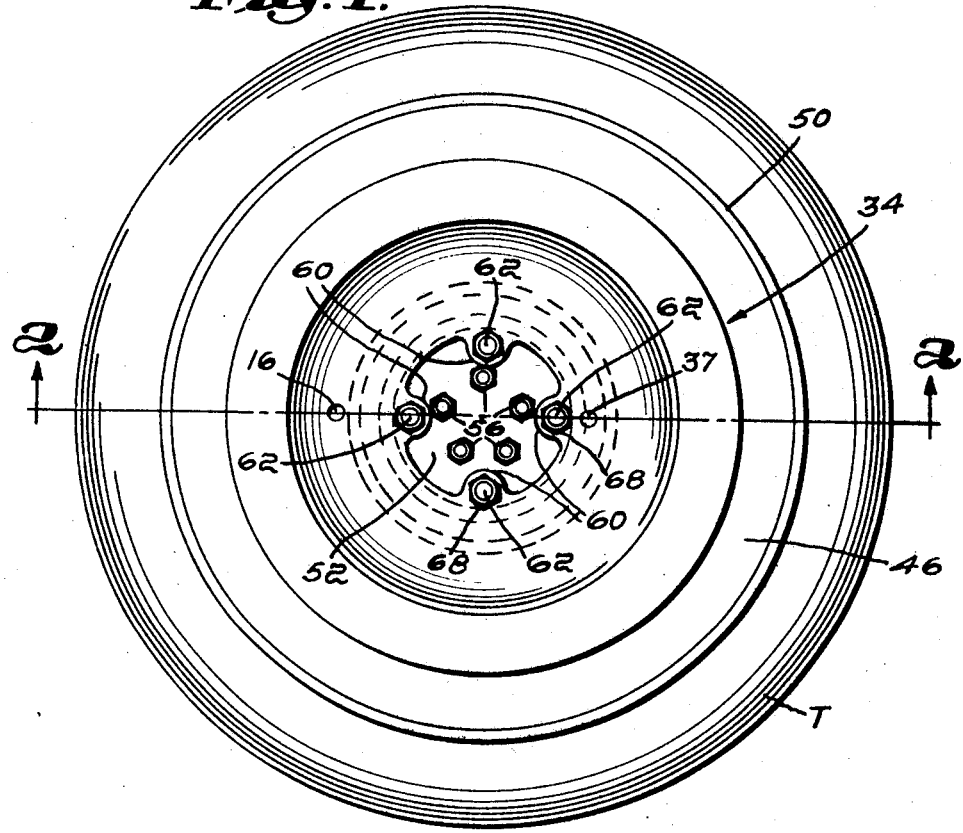
FIG. 1 is an elevational view of my vehicle tire mount with a tire in normal position thereon.
Figure 2:
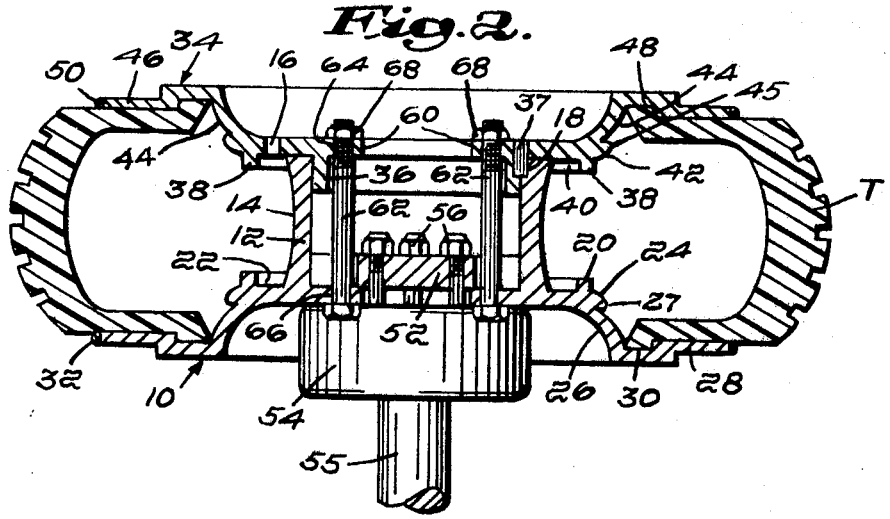
FIG. 2 is a sectional view taken on the line 2—2 of FIG. 1.
Figure 3:
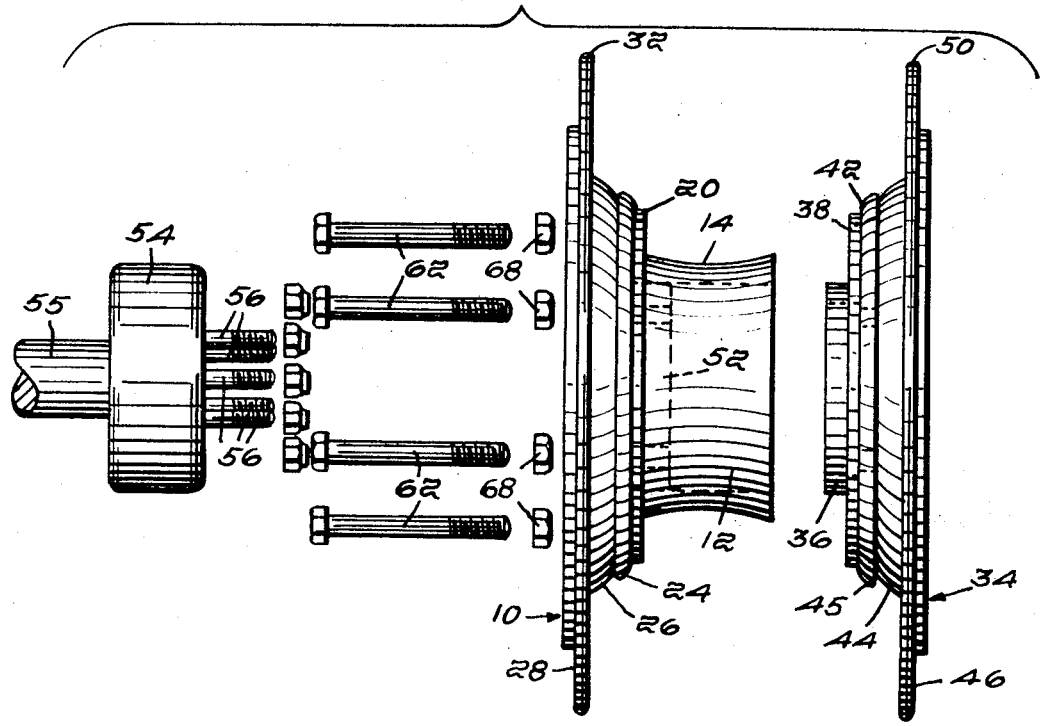
FIG. 3 is an exploded view showing the inner and outer wheel discs and the parts to connect them.

As illustrated my tire mount has an inner wheel disc 10 having an axially extending cylindrical flange 12 serving as an emergency tire receiver that is relatively wide to provide a concave peripheral surface 14 that will receive a vehicle tire T when it is deflated to thus avoid contact with the road. A cut-off 16 in said flange 12 provides space for a valve, and a locking slot 18 also therein at the inner periphery is later referred to.

An annular, axially projecting boundary rim flange 20 projects peripherally outward and bounds a side extremity of said flange 12, being spaced as at 22 from the opposite side extremity of the latter, which space is occupied by said surface 14 to receive a tire when deflated. A retainer member 24 adjoins said flange 20 and slants radially inward therefrom until it meets an annular tire bead mounting 26 having a retaining shoulder 30. On a portion of said mounting 26 an outer portion of a tire normally rests when the tire is inflated. This retainer member 24 overhangs as at 27, said mounting 26 and will normally forestall any tendency of an inflated tire moving towards said surface 14. Said mounting 26 is wider than retainer member 24 and it slopes towards said surface 14 more steeply than the latter.

Peripherally outward of said mounting shoulder 30 is a radially extending flange 28 providing an emergency wheel rim. The parts forming said inner disc 10 may be formed integrally. A rubber tread 32 is preferably provided on the periphery of said rim 28. Said retainer member 24 and a portion of said mounting 26 provide a surface between said flange 12 and said mounting 26 over which a deflated tire tends to move towards said flange 12 and which latter it reaches and there remains.

An axially outer disc 34 has a connector or a collar 36 having a locking pin 37 at its outer periphery that enters said locking slot 18 and prevents said wheel discs 10 and 34 from relative rotation when assembled. Spaced as at 40 from said connector 36 is a projecting flange 38 similar to said flange 20 and that serves as a boundary at one side for said flange 12. Said spaces 22 and 40 are opposite each other and of the same width when said connector 36 extends into said flange 12 and the said inner and outer discs 10 and 34 are assembled together.

Adjoining said flange 38 is a retainer member 42 that slants outwardly from said rim 38, being similar to said retainer member 24 including size and slope. Adjoining said retainer member 42 is a tire bead mounting 44 having a retaining shoulder 48 and that is similar to said mounting 26 and is laterally opposite the latter when the tractions discs 10 and 34 are assembled. Said retainer member 42 overhangs as at 45 said mounting 44, being similar to said overhang 27.

Peripherally outward of said mounting 44 is another flange 46 providing an emergency wheel rim similar to wheel rim 28 and extends radially the same distance. It has a rubber tread 50.

Attached to said flange 12 is a mount 52 with a shaft 55 to which mount the usual wheel hub 54 is attached by bolts 56.

Said outer traction member 34 has lugs 60 extending inwardly through which bolts 62 pass through holes 64 and through holes 66 in said mount 52, thus bolting said inner and outer discs 10 and 34 together by means of nuts 68.

When a tire T deflates, its diameter is reduced and the traction portion that normally extends peripherally beyond said flanges 28 and 46, is peripherally inward of said latter rims, thus keeping the deflated tire from damage. However, since the tire flops unevenly around when deflated, as the vehicle wheel travels, the tire beads tend to move out of said spaces 20 and 40 and the tire involuntarily slides over said mounts 26 and 44, and over said retainer members 24 and 40, and thence over said retaining flanges 20 and 38. This brings the tire with its beads onto said flange 12 and its concave surface 14 where it remains between said flanges 20 and 38, well within the peripheries of said emergency flanges 28 and 46 which are then in traction with the road.

What I claim is:

1. A vehicle wheel comprising an axially inner wheel disc having a central hub attaching portion and an axially extending cylindrical flange disposed radially outwardly thereof, said disc including an annular tire bead mounting and retaining shoulder spaced radially from said cylindrical flange, a flange extending radially of said shoulder to provide an emergency wheel rim, said wheel disc sloping radially inward and axially from said tire bead retaining shoulder toward said central portion and including an annular axially projecting boundary rim flange in radially spaced relation to said cylindrical flange adapted to trap said tire bead if said tire becomes deflated, said wheel including an axially outer disc abutting the end of said cylindrical flange and having an annular axially extending flange telescoping therein in sliding engagement, said axially outer disc radially outwardly of said cylindrical flange being substantially identically configured to said axialy inner disc, and means extending through the central portions of said discs connecting said discs.

References Cited

UNITED STATES PATENTS

| | | | |
|---|---|---|---|
| 1,885,901 | 11/1932 | Ennis | 152—405 |
| 2,210,451 | 8/1940 | Galindo | 301—39 |
| 2,347,622 | 4/1944 | Tschanz | 152—381 X |
| 3,275,377 | 9/1966 | Lucien | 301—6 |

FOREIGN PATENTS

| | | |
|---|---|---|
| 606,545 | 3/1926 | France. |
| 470,291 | 3/1952 | Italy. |

RICHARD J. JOHNSON, Primary Examiner

U.S. Cl. X.R.

301—63